(No Model.)  5 Sheets—Sheet 1.
J. I. NEWBURG.
DAM, REVETMENT, AND JETTY, AND APPARATUS FOR BUILDING SAME.
No. 565,019.  Patented Aug. 4, 1896.
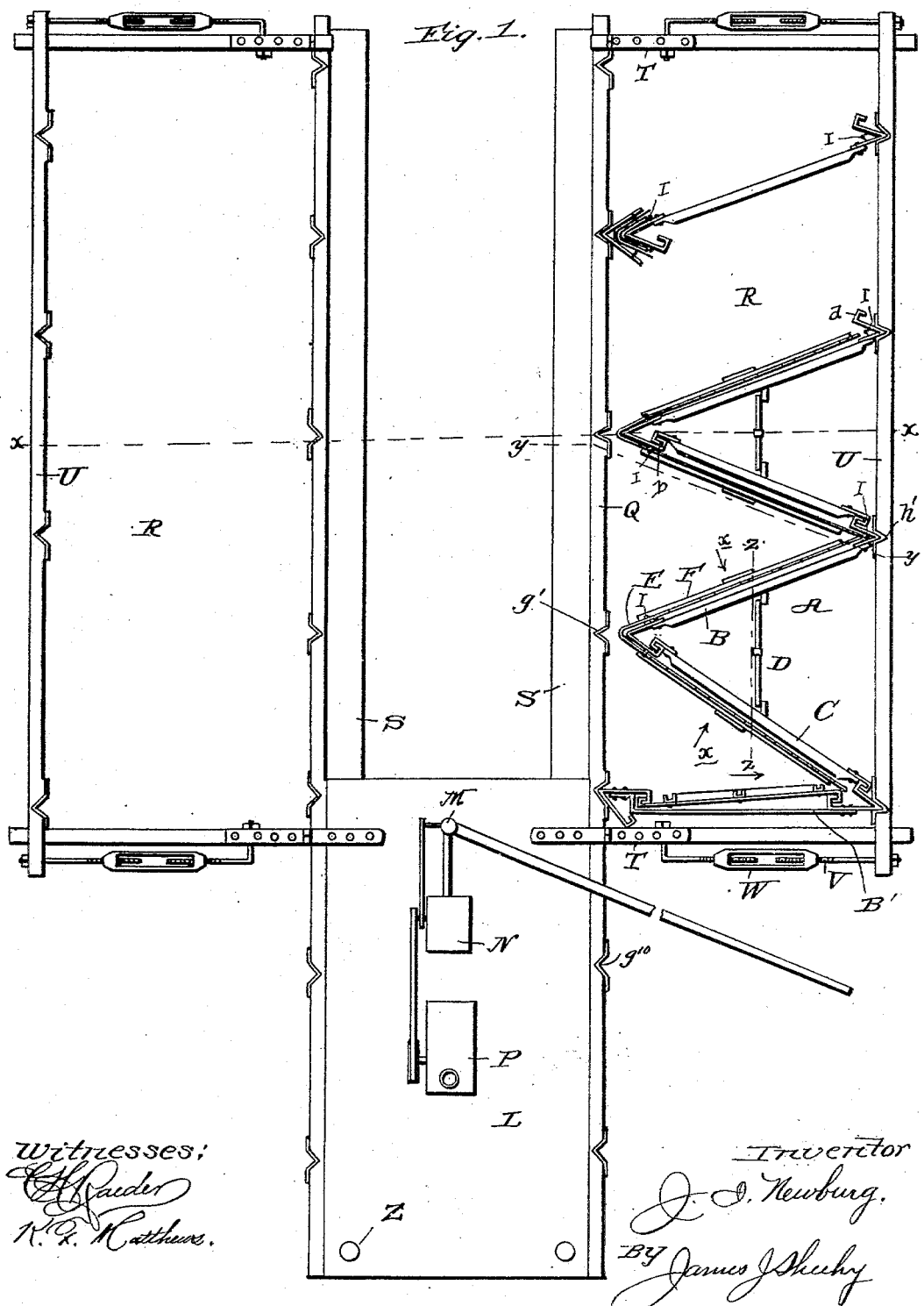

(No Model.) 5 Sheets—Sheet 2.
J. I. NEWBURG.
DAM, REVETMENT, AND JETTY, AND APPARATUS FOR BUILDING SAME.
No. 565,019. Patented Aug. 4, 1896.
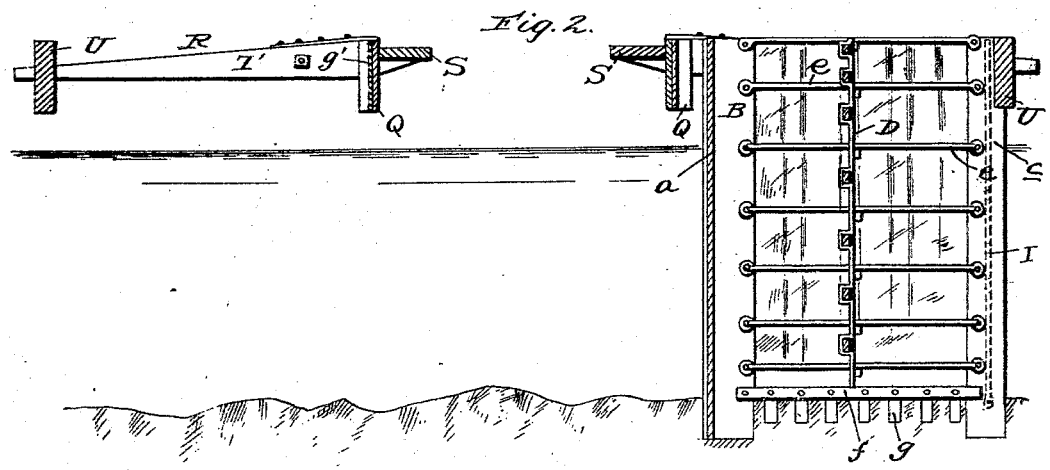
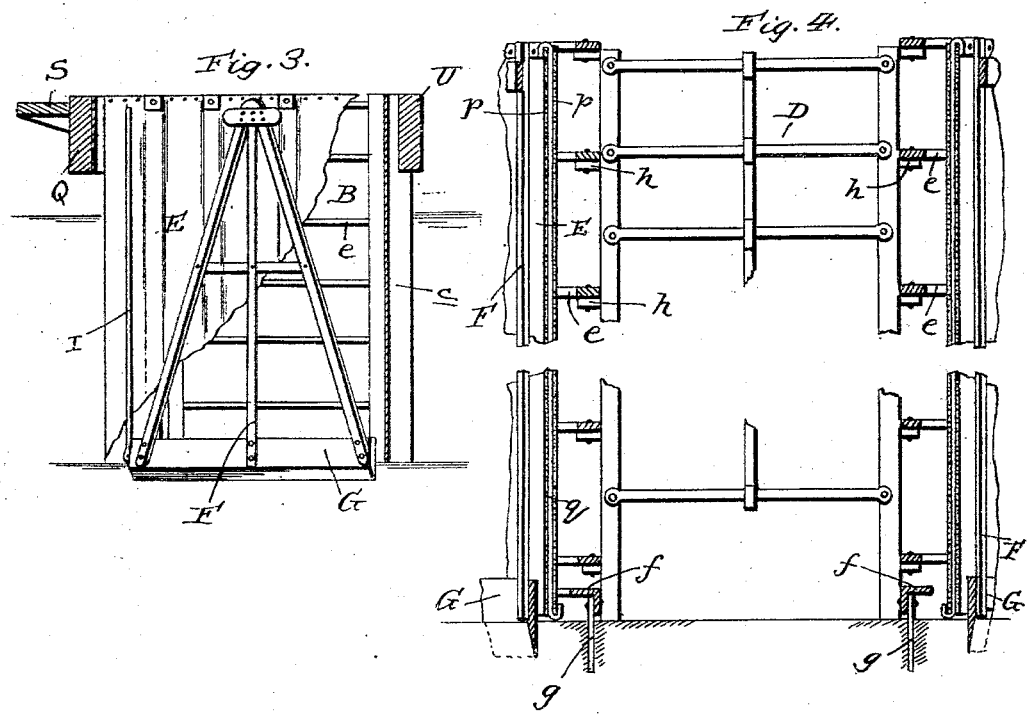
Witnesses:
C. H. Raeder
K. X. Matthews
Inventor
J. I. Newburg.
By James J. Sheby
Attorney (No Model.) 5 Sheets—Sheet 3.
J. I. NEWBURG.
DAM, REVETMENT, AND JETTY, AND APPARATUS FOR BUILDING SAME.
No. 565,019. Patented Aug. 4, 1896.
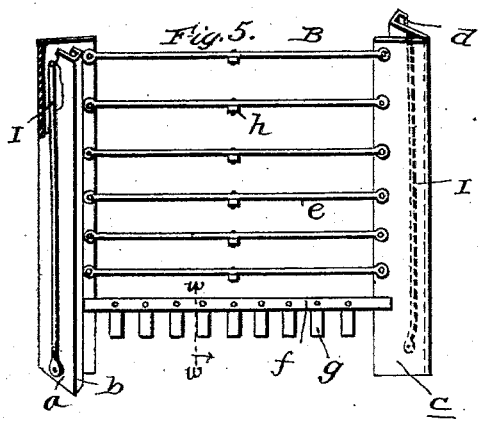
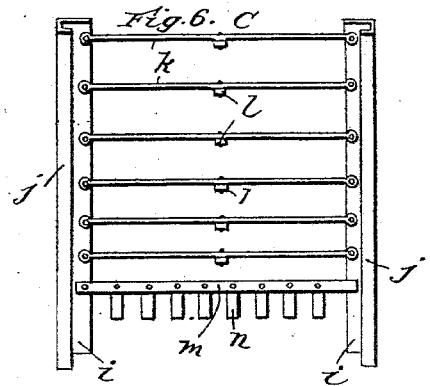
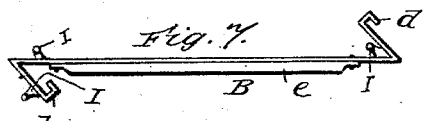
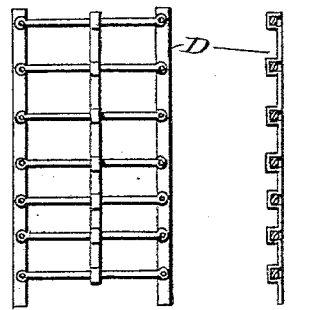
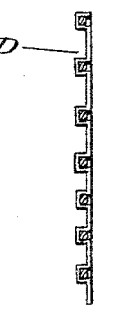
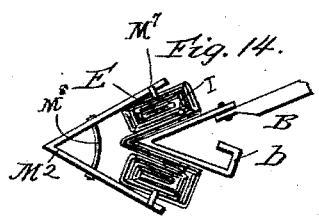
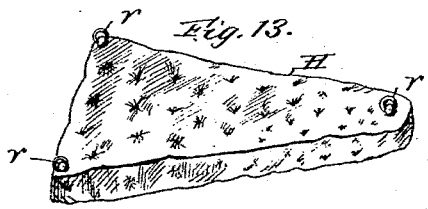
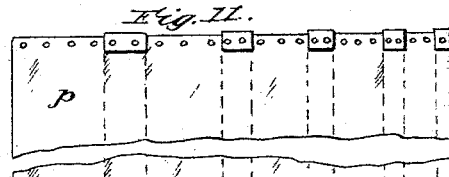
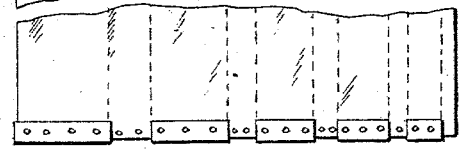
Witnesses:
Inventor
J. I. Newburg.
By James J Sheehy
Attorney
THE NORRIS PETERS CO., PHOTO-LITHO., WASHINGTON, D. C.

(No Model.) 5 Sheets—Sheet 4.
J. I. NEWBURG.
DAM, REVETMENT, AND JETTY, AND APPARATUS FOR BUILDING SAME.
No. 565,019. Patented Aug. 4, 1896.
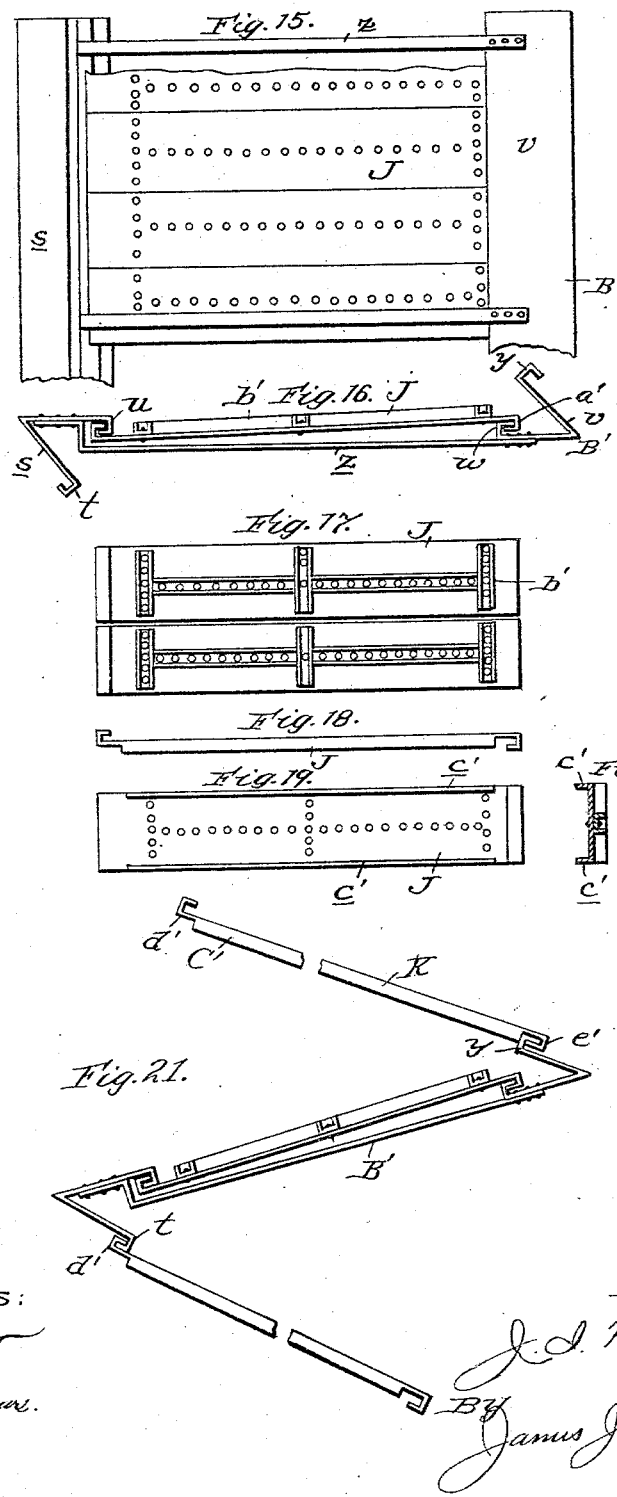

(No Model.) 5 Sheets—Sheet 5.
J. I. NEWBURG.
DAM, REVETMENT, AND JETTY, AND APPARATUS FOR BUILDING SAME.
No. 565,019. Patented Aug. 4, 1896.
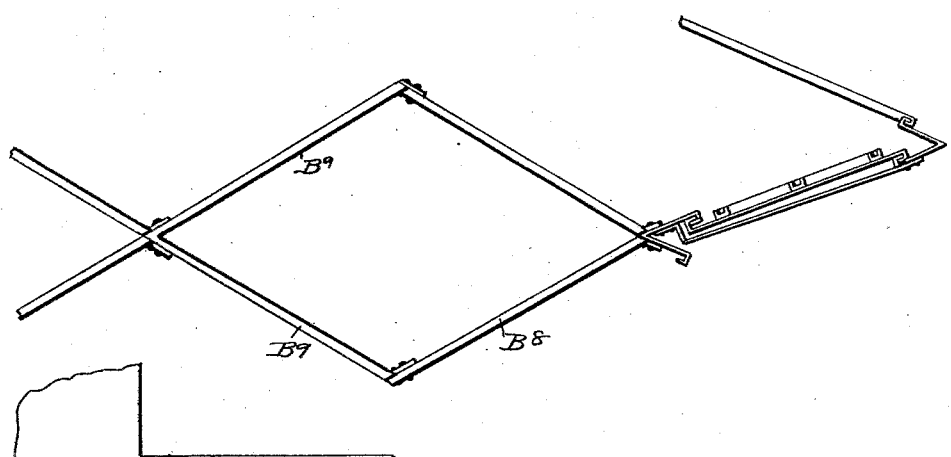
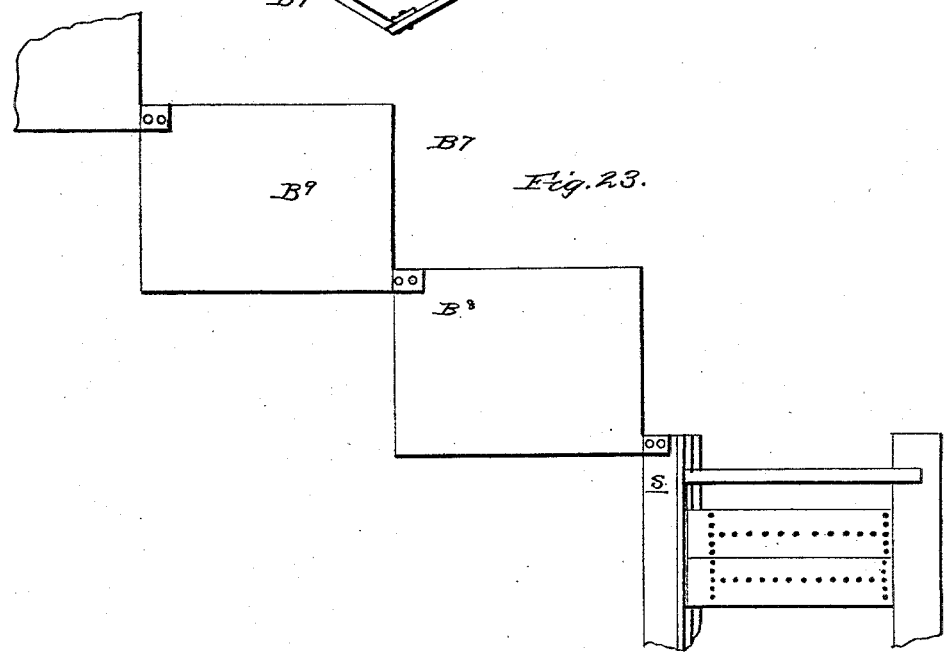

UNITED STATES PATENT OFFICE.

JOHN ISRAEL NEWBURG, OF VICKSBURG, MISSISSIPPI.

DAM, REVETMENT, AND JETTY AND APPARATUS FOR BUILDING SAME.

SPECIFICATION forming part of Letters Patent No. 565,019, dated August 4, 1896.

Application filed October 28, 1895. Serial No. 567,157. (No model.)

*To all whom it may concern:*

Be it known that I, JOHN ISRAEL NEWBURG, a citizen of the United States, residing at Vicksburg, in the county of Warren and State of Mississippi, have invented certain new and useful Improvements in Dams, Revetments, and Jetties and Apparatus for Building the Same; and I do declare the following to be a full, clear, and exact description of the invention, such as will enable others skilled in the art to which it appertains to make and use the same.

My invention relates to dams for closing crevasses in levees, to revetments and jetties, and to an apparatus for expeditiously building crevasse-dams, revetments, and jetties.

One of the objects of my invention is to provide a crevasse-dam comprising parts which may be expeditiously placed and secured in position, which is an important desideratum in this class of devices, and one embodying such a construction and arrangement of parts that only the apexes of angles are presented to the direct pressure of the water, and consequently the pressure of the water is equalized and serves rather to sustain and hold the parts of the dam together and in position than to disconnect and sweep the same away.

Another object of the invention is to provide a crevasse-dam which with slight modifications may be used to advantage and with equal efficiency where the bottom of a stream is hard and where it is soft.

Another object of the invention is to provide a revetment and also a jetty which may be expeditiously built and which, like the crevasse-dam, embody such a construction and arrangement of parts that only the apexes of angles are presented to the direct pressure of the water and the pressure of the water is equalized and is made to serve rather to sustain and hold the parts of the revetment or jetty in position than to disconnect and displace the same.

Still another object of the invention is to provide a portable apparatus designed and adapted to expedite the building of my improved crevasse-dam and one which may be used to advantage in the building of my improved revetment and jetty.

Other objects and advantages of the invention will be fully understood from the following description and claims, when taken in connection with the annexed drawings, in which—

Figure 1 is a plan view illustrating the dam-building apparatus, together with a crevasse-dam in the course of construction. Fig. 2 is a transverse section taken in the plane indicated by the line $x\ x$ of Fig. 1. Fig. 3 is a detail section taken in the plane indicated by the line $y\ y$ of Fig. 1. Fig. 4 is a detail section, on an enlarged scale, taken in the plane indicated by the line $z\ z$ of Fig. 1. Fig. 5 is a perspective view of one of the members of the dam-frame. Fig. 6 is a similar view of one of the frame members of the dam which are arranged between and connected with the members shown in Fig. 5. Fig. 7 is a plan view of the member shown in Fig. 5. Fig. 8 is a transverse section taken in the plane indicated by the line $w\ w$ of Fig. 5. Figs. 9 and 10 are detail views of the braces which are interposed between the members shown in Figs. 5 and 6. Figs. 11 and 12 are detail views of the flexible covering which is placed upon and held against the frame members of the dam. Fig. 13 is a perspective view of one of the mattresses which are employed when the dam is placed upon a hard or rocky bottom. Fig. 14 is a detail plan view showing the manner of placing the flexible covering in position. Figs. 15 to 20 are detail views of parts which enter into the construction of my improved revetments and jetties, and Fig. 21 is a view of a portion of a revetment or jetty. Figs. 22 and 23 are detail views of the extensions at the ends of the revetments.

For convenience of description I will first describe the dam for closing crevasses in levees, together with the apparatus for building the same, and will then describe the revetments and jetties and the manner of constructing the same.

In the drawings similar letters designate corresponding parts in all of the several views, referring to which—

A indicates the main frame of my improved crevasse-dam, and B C (see Figs. 5 and 6) indicate the upright members of said frame. The frame members B, of which a number suitable to the length of the crevasse are employed, are similar in construction, and therefore a description of one will suffice for all. Such members B, as shown in Fig. 5 of the drawings, respectively comprise the upright angle-iron $a$ at one end, which has one of its edges turned into a hook $b$, extending its full length or height, the upright angle-iron $c$ at the opposite end, which has one of its edges turned into a hook $d$, extending its full length or height, the narrow cross-bars $e$, connecting the uprights $a$ and $c$ and having the stops $h$, the lower iron $f$, of angular form in cross-section, which has the vertical portion, which is connected to the uprights $a$ $c$ at or adjacent to the lower end thereof, and the horizontal portion, which is designed to rest upon the bottom of the stream and prevent undue sinking of the member, and the depending fingers $g$, which are connected to the vertical portion of iron $f$ and are designed to take into the ground at the bottom of the stream, so as to better hold the member in position and prevent its being moved by the force of the current. The frame members C, which are arranged alternately with the members B, as shown in Fig. 1, are similar in construction and respectively comprise the end irons $i$, having one of their edges turned into hooks $j$, which extend their full height or length, the cross-bars $k$, connecting the uprights $i$, and having stops $l$, and the angle cross-bar $m$, which is connected and arranged in the same manner as the iron $f$ of the members B, and is provided with fingers $n$ for the same purpose as the fingers of the said members B.

The dam-frame A is built by placing the members B, one by one, in the water until their lower ends rest on and enter into the bottom of the stream and placing the members C in the water between the members B and lowering them so that the hooks $j$ of their end uprights engage the hooks $b$ $d$ of two members B, as shown in Fig. 1, and then lowering the open-work braces D (shown in Figs. 9 and 10) between the members B C. These braces D enter the ground at their lower ends and rest against the stops $h$ $l$ on the members B and C, and serve to hold said members from being pressed together by the current of water.

When placed in the manner described, the frame members B C are braced and securely interlocked and connected together, and are held in the position shown in Fig. 1—viz., with the apexes of the V-shaped angles formed by the frame presented to the stream rushing through the crevasse for a purpose presently described.

E indicates the flexible coverings for the frame A, which are designed and adapted when properly placed against the frame to stop the water and prevent it from rushing through the crevasse. These coverings E may be of any suitable construction, but I prefer to form them each of two thicknesses of heavy canvas $p$ and interposed strips of sheet metal $q$, which are suitably secured between the thicknesses of canvas and have their upper and lower ends bent over upon and riveted to the canvas, as better shown in Fig. 11. In addition to strengthening the canvas coverings the metallic strips $q$ render the coverings rigid, so that they will rest upon the bottom of the stream through the crevasse and stand at the side of the frame, and said strips also increase the weight of the canvas coverings, so that they will sink down to and rest at their lower edges upon the bottom of the stream. The said strips $q$ are of various widths, as shown in Figs. 11 and 12 of the drawings, the strips at or adjacent to the middle of the coverings being the widest and the strips being gradually smaller in width as they approach the ends of the coverings, so as to permit of the canvas being folded, as shown in Fig. 14, in a manner and for a purpose hereinafter more fully described. The alternate metal strips $q'$ of the canvas coverings E are smaller in width than the strips $q$, and like the strips $q$ they are gradually reduced in width as they approach the ends of the coverings to permit of said coverings being compactly folded, as shown in Fig. 14.

The pressure of the water seeking passage through the crevasse holds the canvas coverings E against the frame A, but in order to better hold the coverings E in position, as well as to prevent the water from working under the lower edges of the same, I provide the frames F one of which is shown in its operative position in Fig. 3 of the drawings. These frames F are placed against the outer side of each leaf of each covering E, as shown in Fig. 1 of the drawings, and they are provided at their lower ends with vertically-disposed bars G of about the proportional height shown, which bars have their lower edges beveled or sharpened so as to enable them to penetrate the bottom of the stream and effectually prevent the current from working under the coverings E and passing the dam. This sinking of the frames F in the bottom of the stream also assists in holding them in position and also enables them to better hold the coverings E against the frame.

At the ends of the crevasse-dam I prefer to employ members B', which are interlocked with the members B and C in the manner before described. These members B', like the members of the revetment and jetty hereinafter fully described, comprise a suitable frame and sheet-metal plates carried by the same, and they rest against the levee at the ends of the crevasse therein and are supported or backed by the levee and are pressed and held firmly against the same by the pressure of water trying to escape through the crevasse.

When my improved dam is built in the manner described entirely across a crevasse, it will be observed that only the apexes of V-shape angles and no broadside surfaces are presented to the powerful current of water seeking to escape through the crevasse. By virtue of this it will be seen that the pressure of the water is equalized, that is to say, it strikes the apexes of the angles of the dams and is divided thereby, and then exerts a pressure in the direction of the arrows $x$ in Fig. 1, so that the pressure against one side of each V-shape portion of the dam equalizes or counteracts the pressure against the opposite side of each V-shape portion. Such pressures being in opposite directions tend to prevent each other from displacing or sweeping the dam away, and at the same time they serve to hold the frames F and the coverings E against the members B C of the frame A, and such members B C against the braces D, and in fact serve to sustain and hold the parts of the dam together and strengthen the dam rather than to weaken the same.

When the bottom of the stream is rocky or hard, so that the bars G at the lower end of the frames F cannot penetrate the same, mattresses H, such as shown in Fig. 13 of the drawings, are used in lieu of the frames F to prevent the water from working its way under the dam. These mattresses H are of approximate V shape to fit the spaces between the frame members B C of the dam, and they are provided at their corners with rings $r$, which are designed to receive the vertical rods I, which are connected at their lower ends only to the uprights $a$ $c$ of the frame members B, as shown. These rods I serve to hold the mattresses H snugly in position within the spaces between the frame members B and C, and the mattresses are carried to and held upon the bottom of the crevasse by stones, earth, or any other weight placed on or in the mattresses, so as to enable the matresses to serve the function mentioned—viz., to prevent the water from working its way under the dam. The mattresses H may also be used to advantage in lieu of the frames F when quicksands are encountered.

My improved dam when placed in position may, if desired, form a permanent part of the levee. I prefer, however, when the water in the stream, which the levee borders, subsides to remove my improved dam and close the crevasse by earth and the other materials ordinarily employed for such purpose. This makes a cheaper closure than my improved dam and permits of the parts entering into the dam being used repeatedly to form other temporary crevasse-dams.

The revetment or jetty construction shown in Figs. 15 to 21 embodies the same principle as my improved crevasse-dam, that is to say, the parts of the revetment or jetty are so constructed and arranged as to equalize the pressure of the water in the manner before described. The jetties and revetments, as shown in Fig. 21, comprise the members B' and the alternate members C'. The members B' of the jetty and revetment construction, respectively, comprise the upright $s$, of angular form in cross-section, which has its edges turned into hooks $t$ $u$, extending its full height or length, the upright $v$, of angular form in cross-section, having its edges turned into hooks $w$ $y$, which extend its full length or height, the bars $z$, which connect the uprights $s$ and $v$ at points adjacent to the upper and lower ends thereof, and the plates J, which have hooks $a'$ at their ends engaging the hooks $u$ and $w$ of the uprights $s$ and $v$, and are arranged one above the other the full height of the member B', as shown. These plates J are provided with strengthening-ribs $b'$, and they may be provided at their upper and lower edges with flanges $c'$, as shown in Figs. 18, 19, and 20, or such flanges may be omitted, as shown in Figs. 16 and 17, according to the nature of the bottom upon which the revetment or jetty rests.

The members C' of the jetty or revetment construction, which alternate with the members B', are formed by plates K, which are similar to the plates J, except that they are of a greater length. These plates K have oppositely-directed hooks $d'$ $e'$ at their ends, which are designed to engage or be interlocked with the hooks $t$ $y$ of the members B' in the manner shown in Fig. 21, the said plates K being placed one upon the other from the bottom to and, if desirable, above the surface of the water.

In building revetments or jetties the members B' are placed one by one in position, the plates J being preferably placed in position in the main frame of the members B' after such main frame is placed in the water and on the bottom. The plates K forming the alternate members of the revetment or jetty are then interlocked with the hooks of the members B' and lowered to position. A revetment or jetty such as just described may be quickly and easily built, and by reason of the peculiar principle of construction involved and the weight of the parts is well adapted to withstand the force and pressure of water, which is a desideratum.

The crevasse-dam, revetment, and jetty described may be built by any suitable means, but I prefer, for the sake of expedition, to build them, particularly the crevasse-closing dam, with the improved portable apparatus illustrated in Figs. 1, 2, 3, and 14, which forms part of my invention.

The boat or float L of the apparatus illustrated, which is designed more particularly for building crevasse-dams, is provided at its sides with grooves $g^{10}$, for a purpose presently described, and is equipped with a crane M, hoisting machinery N, and a steam-engine P, as shown, which are of the ordinary construction and need not, therefore, be illustrated in detail. Connected to said boat L, preferably at the sides thereof and extending beyond one end of the boat, as shown in Fig. 1, are bars Q, which form the inner longitudinal sides of the frames R, in which the members B C of the dam-frame are placed in building the dam. At proper intervals in their length, and in their outer sides, these bars Q are provided with the vertical V-shaped grooves $g'$, which are preferably sheathed with metal, as shown, to prevent frictional wear, and upon their inner sides said bars Q are provided with foot-boards S, which are supported by suitable brackets, as illustrated, and are designed to support workmen engaged in guiding and placing the parts of the dam in position.

T indicates bars which are connected in a hinged manner with the bars Q and extend laterally outward therefrom, as shown, and form the ends of the frames R, and U indicates bars, which are mounted upon the bars T and form the outer longitudinal sides of the frames R. These bars U are provided in their inner sides with vertical V-shaped grooves $h'$, arranged at about the points shown, and they are connected with the bars T by the rods V, having turnbuckles W, whereby they may be lengthened and shortened for a purpose presently described.

The apparatus described is adapted for closing crevasses in levees on either side of a stream, and where a levee is built upon but one side of a steam it is obvious that one of the frames R may be dispensed with.

When a crevasse is to be closed by my improved apparatus and dam, the parts which enter into the improved dam are placed upon the boat L and the apparatus is towed to the point where the crevasse is located and the boat is secured by a cable passed around one or both of the capstans Z and fastened on the levee or shore. The frame R contiguous to the levee is carried into the crevasse by the current of water taken through the crevasse and in such position is ready for operation.

The building of the dam is effected by raising the frame members B of the dam by means of the hoisting machinery and crane and lowering them within the frame R, and so that their angle-irons $a$ $c$ rest in the grooves of the bars Q U, respectively, until their lower ends rest on the bottom of the crevasse. When the members B are thus placed, it will be observed that they will be securely held in position until the alternate frame members C are placed in position. Such frame members C are lowered by means of the crane and hoisting machinery until their lower ends rest upon the bottom of the crevasse, the hooks at their ends being interlocked with those at the ends of the members B, as shown. The members B' at the ends of the dam are also lowered by means of the crane and hoisting machinery and are interlocked with the end frame members of the dam, as shown. The braces D between the frame members B C are now lowered to the position shown in Fig. 1, after which the turnbuckles W of the rods V are loosened to lengthen the rods and afford spaces between the angle-irons of the frame members B and the bar Q to permit of the angle-iron shield $M^2$, which has a brace $M^8$, being placed in position, as shown in Fig. 1, to permit of a ready placement of the coverings E on the frame A.

The coverings E are placed one by one over the angular portions of the frame A, formed by the members B C, and a description of the placement of one covering will suffice for all. When the covering is to be placed, the shield $M^2$, with the apex of its angle in one of the grooves $g'$ of frame R, is lowered until its lower end rests on the bottom of the stream. The covering E, folded as shown in Fig. 14 of the drawings, is placed in position with the shield $M^2$, or after the shield is in position, and is lowered until its lower edge rests upon the bottom of the stream. The covering E is preferably placed in position with the shield $M^2$, the hooks $M^7$ engaging the covering, as shown, and the shield $M^2$ is then raised, when the current of water will unfold the covering E along both sides of the angular portion formed by the frame members B C, and will enable said covering to effectually prevent the passage of water.

The ends of all of the coverings E rest, as shown, in the rear angle-irons of the members B, and therefore it will be observed that the passage of water between said edges is effectually prevented.

Passage of water below the edges of the coverings E and the frame A is effectually prevented by the frames F, which are lowered to position by the crane and hoisting machinery after the coverings E are in position, and when the nature of the bottom is such as to preclude the use of the frames F the mattresses H are employed to prevent the passage of water under the coverings E and frame A.

When one section of the dam has been completed, the frame R is raised on its hinges to disengage it from the frame of the dam and the rods V are shortened, after which the apparatus is moved to such a position that the building of the dam may be continued until it extends across and entirely closes the crevasse, the grooves $g^{10}$ being placed in engagement with the V-shaped sections already placed, so that the new sections will be the proper distance apart.

The jetty and revetment constructions described may be built by the apparatus described in substantially the same way as the crevasse-dam, the members being lowered with their ends interlocked, as shown.

It will be appreciated from the foregoing that my improved crevasse-closing dam may be very quickly and easily built and that it is adapted to retain its position and to withstand and block the passage of the powerful current which tends to take through a crevasse. It will also be observed that by reason of the peculiar construction of my improved dam and the apparatus employed it may be built with little difficulty, notwithstanding the force of the water taking through the crevasse, which is a highly important desideratum.

I have in some respects specifically described the construction and relative arrangement of the parts of my improvements in order to impart a full, clear, and exact understanding of the same, but I do not desire to be understood as confining myself to such exact construction and arrangement, as such changes or modifications may be made in practice as fairly fall within the scope of my invention.

When my improved revetment is used at the base of caving banks, I employ in conjunction with it extensions $B^7$, such as illustrated in Figs. 22 and 23, one of which is preferably employed at each end of the revetment when necessity requires, although but one end of the revetment may be provided with an extension when desired. The extensions $B^7$ are similar in construction, and therefore a description of the one illustrated in Figs. 22 and 23 will suffice for all. The said extension is designed to extend in a step-like manner up the bank from the water edge and from a series of approximate diamond-shaped inclosures which are by reason of their form enabled to resist the pressure of the water and are at the same time adapted to be filled up by the sediment which settles from the still water which they produce, and are consequently adapted to prevent the banks from washing away. It (the extension) comprises the two upright members $B^8$, which are connected by bolts, rivets, or the like to the upright $s$ of the end member of the revetment adjacent to the upper end thereof, and diverge therefrom, the members $B^7$, which are connected to the outer ends of the members $B^8$, adjacent to the upper edges thereof and converge therefrom and have their inner ends connected together and to the ends of the next succeeding members $B^9$, as shown, and so on to the top of the bank. Each pair of members are connected adjacent to their lower edges to the preceding members adjacent to the upper edges thereof, and consequently it will be perceived that each pair will rest in a plane above the preceding pair to conform to the pitch of the bank, as illustrated.

Having described my invention, what I claim is—

1. A construction for dams, revetments, jetties and other water-barriers, comprising an angular portion of approximate V shape having its apex so arranged as to enable it to equalize the pressure or force of water, and a flexible covering placed at an intermediate point of its length against the apex of the angular portion and adapted to be held against the sides of said angular portion, substantially as specified.

2. A construction for dams, revetments, jetties and other barriers comprising two members having interlocked hooks at their contiguous ends, the said members being so arranged as to form an angular portion of approximate V shape having its apex so arranged as to enable it to equalize the pressure or force of water, substantially as described.

3. A construction for dams, revetments, jetties, and other barriers, comprising a member provided with an upright of angular form in cross-section at one end having one of its vertical edges formed into a hook, and a second member provided with an upright at one end having one of its vertical edges formed into a hook and engaging the hook of the first-named member, the said members being so arranged as to form an angular portion of approximate V shape having its apex so arranged as to enable it to equalize the pressure or force of water, substantially as and for the purpose set forth.

4. A construction for dams, revetments, jetties, and other water-barriers, comprising a plurality of members provided with uprights of angular form in cross-section at their ends having one of their vertical edges formed into hooks, and alternate members provided with uprights at their ends having one of their vertical edges formed into hooks engaging the hooks of the first-named members; the said members being so arranged as to form a plurality of angular portions of approximate V shape having their apexes so arranged as to enable them to equalize the pressure or force of water, substantially as described.

5. A construction for dams and the like, comprising two members having their contiguous ends connected together, said members being so arranged as to form an angular portion of approximate V shape having its apex so arranged as to enable it to equalize the pressure or force of water, and a flexible covering placed at an intermediate point of its length against the apex of the angular portion and adapted to be held against the sides of said angular portion, substantially as specified.

6. A construction for dams and the like, comprising a plurality of members having their contiguous ends connected together and arranged so as to form angular portions of approximate V shape having their apexes so arranged as to enable them to equalize the pressure or force of water and flexible coverings placed at an intermediate point of their length against the apexes of the angular portions and adapted to be held against the sides of said angular portions by the force of the water, substantially as specified.

7. A construction for dams and the like, comprising a plurality of members provided with uprights of angular form in cross-section at their ends having one of their edges formed into hooks, alternate members having hooks at their ends engaging and connected with the hooks of the first-named members; the said members being arranged so as to form angular portions of approximate V shape having their apexes so arranged as to enable them to equalize the pressure or force of water, and flexible coverings placed against the apexes of the angular portions and adapted to be held against the sides of said angular portions by the force of the water and having their ends arranged in the angular uprights of the frame members so as to prevent the escape of the water between said edges, substantially as and for the purpose set forth.

8. A construction for dams and the like comprising a plurality of members having their contiguous ends connected together, and arranged so as to form angular portions of approximate V shape having their apexes arranged so as to enable them to equalize the pressure or force of water, braces arranged between the members forming the angular portions, and flexible coverings placed at an intermediate point of their length against the apexes of the angular portions and adapted to be held against the sides of said angular portions, substantially as and for the purpose set forth.

9. A construction for dams and the like, comprising a plurality of members having their contiguous ends connected together and arranged so as to form angular portions of approximate V shape having their apexes so arranged as to enable them to equalize the pressure or force of water, flexible coverings placed at an intermediate point of their length against the apexes of the angular portions and adapted to be held against the sides of said angular portions and means for preventing the water from working under the lower edges of the coverings, substantially as specified.

10. A construction for dams and the like, comprising a plurality of members having their contiguous ends connected together, and arranged so as to form angular portions of approximate V shape having their apexes so arranged as to enable them to equalize the pressure or force of water, flexible coverings placed against the apexes of the angular portions and adapted to be held against the sides of said angular portions by the force or pressure of the water and mattresses arranged within the V-shaped or angular portions and connected with the members and adapted to be held upon the bottom so as to prevent the escape of water under and past the dam, substantially as and for the purpose set forth.

11. In a dam for closing crevasses in levees, the members B, comprising the end uprights of angular form in cross-section having one of their vertical edges formed into hooks, the bars connecting said uprights, the angle-iron connecting the uprights at or adjacent to the lower ends thereof and the fingers connected to and depending from the angle-iron, the members C, alternating with the members B, and comprising uprights at their ends having hooks engaging the hooks of the members B, the bars connecting said uprights, the angle-iron connecting the uprights at or adjacent to the lower ends thereof and the fingers connected to and depending from the angle-iron; said members B, C, being so arranged as to form angular portions of approximate V shape having their apexes arranged so as to enable them to equalize the pressure or force of the water, braces interposed between the members B, C, and flexible coverings placed against the apexes of the angular portions and adapted to be held by the pressure of water against the sides of the V-shaped portions, substantially as and for the purpose set forth.

12. In a dam for closing crevasses in levees, the members B, comprising the end uprights of angular form in cross-section having one of their vertical edges formed into hooks, the bars connecting said uprights, the angle-iron connecting the uprights at or adjacent to the lower ends thereof and the fingers connected to and depending from the angle-iron, the members C, alternating with the members B, and comprising uprights at their ends having hooks engaging the hooks of the members B, the bars connecting said uprights, the angle-iron connecting the uprights at or adjacent to the lower ends thereof and the fingers connected to and depending from the angle-iron; said members B, C, being so arranged as to form angular portions of approximate V shape having their apexes arranged so as to enable them to equalize the pressure or force of the water, braces interposed between the members B, C, the members B', arranged at the ends of the dam and having hooks engaging the hooks at the ends of the members next to them and flexible coverings placed against the apexes of the angular portions and adapted to be held against the sides of the V-shaped angular portions, substantially as and for the purpose set forth.

13. An apparatus for building dams, jetties, and revetments, such as described, comprising a suitably-supported open frame provided in its sides with grooves or ways adapted to guide parts of the dam, jetty, or revetment to position and hold them in proper position for the connection of other parts; the said frame being adapted to be enlarged so as to permit of its being readily raised out of engagement with the parts of the dam, jetty, or revetment, substantially as described.

14. An apparatus for building dams, jetties, and revetments such as described comprising a suitable support, a frame having a portion connected in a hinged manner with the support and provided in its sides with grooves or ways adapted to guide parts of the dam, jetty, or revetment to position and hold them in proper position for the connection of other parts; the said frame being adapted to be enlarged to permit of its being raised out of engagement with the parts of the dam, jetty, or revetment, substantially as described.

15. A portable apparatus for building dams, jetties, and revetments such as described, comprising a boat or float, a frame having a portion connected in a hinged manner with the boat or float and provided in its sides with grooves or ways adapted to guide parts of the dam, jetty or revetment to position and hold them in proper position for the connection of their parts; the said frame being adapted to be enlarged to permit of its being raised out of engagement with the parts of the dam, jetty or revetment, substantially as described.

16. A portable apparatus for building dams, jetties, and revetments, such as described, comprising a boat or float, and a frame comprising a longitudinal bar fixedly connected with the boat or float and having vertical grooves in its outer side, and bars connected in a hinged manner with the boat or float and the fixed longitudinal bar, an outer longitudinal bar arranged upon and adjustably connected with the end bars so as to permit of it being moved toward or from the inner longitudinal bar and having vertical grooves in its inner side, substantially as and for the purpose set forth.

17. A portable apparatus for building dams, jetties, and revetments, such as described, comprising a boat or float, and a frame comprising a longitudinal bar fixedly connected with the boat or float and having vertical grooves in its outer side, end bars connected in a hinged manner with the boat or float and the fixed longitudinal bar, an outer longitudinal bar arranged upon the end bars and having vertical grooves in its inner side, and rods provided with turnbuckles connecting said outer longitudinal bar and the end bars, substantially as specified.

18. A portable apparatus for building dams, jetties, and revetments, such as described, comprising a boat or float, open frames connected by the float or boat and disposed on opposite sides of the boat at one end thereof and having grooves or ways in their sides adapted to guide parts of the dam, jetty, or revetment to position and hold them in proper position for the connection of other parts and also having foot-boards along their inner sides, substantially as and for the purpose set forth.

19. In a dam, the combination with members connected together and arranged so as to form an angular or V-shaped portion having its apex so arranged as to enable it to equalize the pressure of water, a folded flexible covering and a shield of angular form in cross-section adapted to be placed in advance of the apex of the V-shaped portion to permit of the interposition of the folded covering and also adapted to be removed to enable the current to unfold the covering and press and hold it against the sides of the V-shaped portion, substantially as and for the purpose set forth.

20. A revetment comprising a plurality of members arranged so as to form angular portions of approximate V shape with their apexes so arranged as to enable them to equalize the pressure or force of water and having their contiguous ends connected together, and an extension connected to one end member of the revetment and adapted to extend up a bank, and comprising a series of connected members arranged in pairs in a step-like manner and so as to form approximate diamond-shaped inclosures, substantially as and for the purpose set forth.

In testimony whereof I affix my signature in presence of two witnesses.

JOHN ISRAEL NEWBURG.

Witnesses:
D. J. SHLENKER,
GUSTAV SINA.